US011743284B2

(12) United States Patent
Rubin

(10) Patent No.: US 11,743,284 B2
(45) Date of Patent: Aug. 29, 2023

(54) MULTI-FACTOR ILLICIT ENUMERATION DETECTION

(71) Applicant: Microsoft Technology Licensing, LLC, Redmond, WA (US)

(72) Inventor: Mor Rubin, Ashdod (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 17/146,853

(22) Filed: Jan. 12, 2021

(65) Prior Publication Data

US 2022/0224715 A1 Jul. 14, 2022

(51) Int. Cl.
*H04L 9/40* (2022.01)
*G06N 20/00* (2019.01)

(52) U.S. Cl.
CPC ...... *H04L 63/1441* (2013.01); *H04L 63/0807* (2013.01); *G06N 20/00* (2019.01)

(58) Field of Classification Search
CPC ............. H04L 63/1441; H04L 63/0807; H04L 63/1425; G06N 20/00; G06F 21/552
See application file for complete search history.

(56) References Cited

U.S. PATENT DOCUMENTS

| 11,444,962 | B2 * | 9/2022 | Grume | H04L 63/1416 |
| 11,503,078 | B2 * | 11/2022 | Parekh | H04L 63/20 |
| 2017/0244730 | A1 * | 8/2017 | Sancheti | H04L 63/20 |
| 2017/0324758 | A1 * | 11/2017 | Hart | H04L 63/0428 |
| 2019/0205885 | A1 * | 7/2019 | Lim | G06Q 20/4016 |
| 2020/0098037 | A1 | 3/2020 | Lutnick | |
| 2020/0267178 | A1 | 8/2020 | Maor et al. | |
| 2021/0136101 | A1 * | 5/2021 | Ben-Yosef | H04L 63/1433 |
| 2021/0409430 | A1 * | 12/2021 | Alford | H04L 63/1416 |

OTHER PUBLICATIONS

"International Search Report and Written Opinion Issued in PCT Application No. PCT/US21/061050", dated Mar. 21, 2022, 12 Pages.

* cited by examiner

*Primary Examiner* — Christopher A Revak
(74) *Attorney, Agent, or Firm* — Wade IP Law PLLC

(57) ABSTRACT

Techniques are described herein that are capable of using multiple factors to detect illicit enumeration. Object requests are parsed among request types such that each request type includes object request(s) that share a respective common attribute. Each object request requests information about an object. Scores are generated for the respective request types such that the score for each request type is based at least in part on a count of the object request(s) in the respective request type. The scores for the respective request types are aggregated to provide a malicious activity score that represents a likelihood that the illicit enumeration has occurred. The malicious activity score is compared to a score threshold. A remedial operation is selectively performed with regard to the illicit enumeration based at least in part on whether the malicious activity score is greater than or equal to the score threshold.

21 Claims, 6 Drawing Sheets

MULTI-FACTOR ILLICIT ENUMERATION DETECTION

BACKGROUND

A cloud computing service is a cloud-based service (e.g., software service) that is configured to provide shared computer system resources (e.g., computer processing and/or data storage) to computing devices on demand. For instance, the cloud computing service may provide such computer system resources to a user of the cloud computing service without direct active management by the user. Malicious entities commonly attempt to enumerate users of cloud computing services to discover information regarding accounts of those users. For instance, such information may include usernames, passwords, passphrases, and/or keys associated with the accounts.

In one example, a malicious entity may launch a brute-force attack against a cloud computing service by submitting possible passwords with regard to a username associated with an account of the cloud computing service with the hope of eventually guessing the correct password (e.g., a combination of characters) that corresponds to the username to enable the malicious entity to access the account. In another example, the malicious entity may perform an exhaustive key search by submitting multiple possible keys in an effort to guess a key that is created from the password of the account using a key derivation function.

A variety of techniques has been proposed to detect illicit enumeration. However, each such technique has its limitations. For instance, most conventional techniques for detecting illicit enumeration create a substantial number of false positives, rely on a single factor, and/or have limited applicability.

SUMMARY

Various approaches are described herein for, among other things, using multiple factors to detect illicit enumeration. Enumeration is a process of submitting multiple possible credentials with regard to an object in an effort to guess a credential that enables information about the object to be obtained. For instance, the information may include content of the object and/or a credential associated with the object. Examples of an object include but are not limited to a user (e.g., an account of the user), a group of users (e.g., an account of the group), an application, and a computer. Examples of a credential include but are not limited to a username, a group name, a password, a passphrase, and a key. Illicit enumeration is enumeration that is performed by a malicious entity.

In an example approach of detecting illicit enumeration, object requests are parsed among request types such that each request type includes object request(s) that share a respective common attribute. Each object request requests information about an object. Scores are generated for the respective request types such that the score for each request type is based at least in part on a count of the object request(s) in the respective request type. The scores for the respective request types are aggregated to provide a malicious activity score that represents a likelihood that the illicit enumeration has occurred. The malicious activity score is compared to a score threshold. A remedial operation is selectively performed with regard to the illicit enumeration based at least in part on whether the malicious activity score is greater than or equal to the score threshold.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
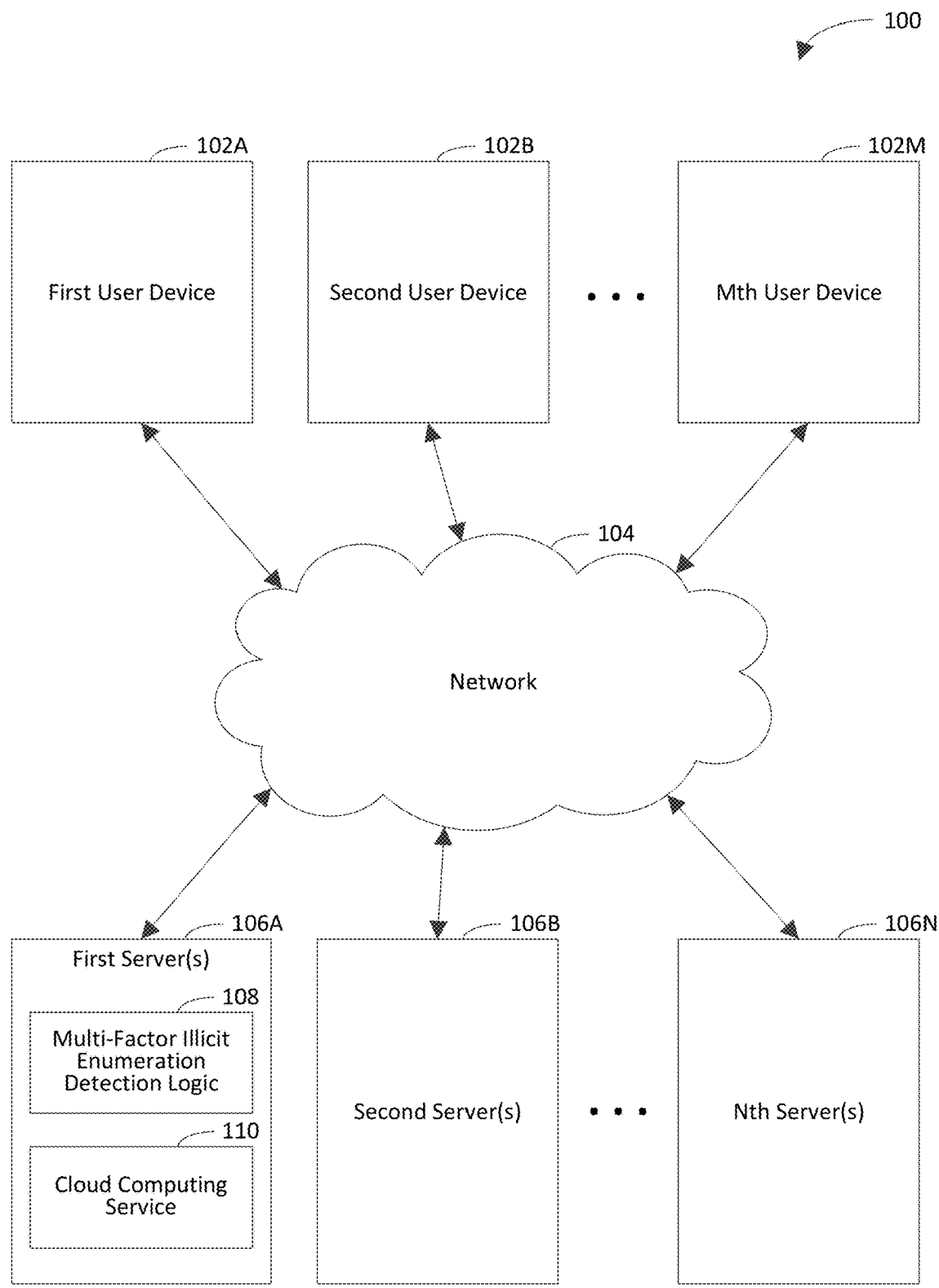
FIG. 1 is a block diagram of an example multi-factor illicit enumeration detection system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of using multiple factors to detect illicit enumeration. Enumeration is a process of submitting multiple possible credentials with regard to an object in an effort to guess a credential that enables information about the object to be obtained. For instance, the information may include content of the object and/or a credential associated with the object. Examples of an object include but are not limited to a user (e.g., an account of the user), a group of users (e.g., an account of the group), an application, and a computer. Examples of a credential include but are not limited to a username, a group name, a password, a passphrase, and a key. Illicit enumeration is enumeration that is performed by a malicious entity.

Example techniques described herein have a variety of benefits as compared to conventional techniques for detecting illicit enumeration. For instance, the example techniques may be capable of increasing accuracy and/or precision of a determination of illicit enumeration. For instance, by using multiple factors to identify illicit enumeration (e.g., to distinguish illicit enumeration from enumeration that is not illicit), a more robust determination regarding illicit enumeration may be made, which may result in greater accuracy and/or precision. Accordingly, the example techniques may reduce a likelihood of a false positive determination of illicit enumeration and/or increase a likelihood of a true positive determination of illicit enumeration, as compared to conventional techniques.

By identifying illicit enumeration in accordance with any one or more of the example techniques described herein, security of a cloud computing service and/or security of computer(s) on which the cloud computing service executes may be increased. For instance, the example techniques may inhibit (e.g., prevent) a malicious entity from illicitly enumerating or continuing to illicitly enumerate objects associated with the cloud computing service. The example techniques may be capable of selectively performing a remedial operation with regard to an enumeration of objects depending on whether the enumeration is detected to be illicit.

The example techniques may reduce an amount of time and/or resources (e.g., processor cycles, memory, network bandwidth) that is consumed to detect illicit enumeration and/or to determine whether a detection of illicit enumeration is a false positive. For instance, by more accurately and/or more precisely detecting illicit enumeration, the time and resources associated with determining whether a detection of illicit enumeration is a false positive may be mitigated (e.g., avoided). For instance, it may be unnecessary to perform operations to confirm that a detection of illicit enumeration is accurate. The example techniques may thereby reduce a cost associated with detecting illicit enumeration, for example, by not incurring a cost that is attributable to determining whether the detection of the illicit enumeration is a false positive. The example techniques may increase efficiency of a computing system that executes the cloud computing service, for example, by reducing an amount of illicit enumeration that is encountered by the cloud computing service. For instance, by detecting the illicit enumeration and/or performing a remedial operation with regard to the illicit enumeration, the example techniques may reduce the amount of illicit enumeration that is encountered by the cloud computing service.

The example techniques may improve (e.g., increase) a user experience and/or increase efficiency of a user of a cloud computing service, for example, by detecting illicit enumeration that is encountered by the cloud computing service and/or performing a remedial operation to mitigate the illicit enumeration. For instance, by detecting the illicit enumeration and/or performing the remedial operation, an amount of the user's time that would have been consumed to remedy a compromised account of the user may be reduced. The example techniques are applicable to any suitable environment, including but not limited to a cloud environment and an on-premises (a.k.a. on-prem) environment. For instance, the on-prem environment may be a domain environment.

FIG. 1 is a block diagram of an example multi-factor illicit enumeration detection system 100 in accordance with an embodiment. Generally speaking, the multi-factor illicit enumeration detection system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the multi-factor illicit enumeration detection system 100 detects illicit enumeration that is encountered by a cloud computing service 110. Detail regarding techniques for detecting illicit enumeration is provided in the following discussion.

As shown in FIG. 1, the multi-factor illicit enumeration detection system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. Any one or more of the computer programs may be a cloud computing service (e.g., cloud computing service 110). In accordance with some example embodiments, the servers 106A-106N are configured to host respective Web sites, so that the Web sites are accessible to users of the multi-factor illicit enumeration detection system 100.

The first server(s) 106A are shown to include multi-factor illicit enumeration detection logic 108 and the cloud computing service 110 for illustrative purposes. The cloud computing service 110 is a cloud-based service (e.g., software service) that is configured to provide shared computer system resources (e.g., computer processing and/or data storage) to one or more of the user devices 102A-102M on demand. Examples of a cloud computing service include but are not limited to Azure® developed and distributed by Microsoft Corporation, Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., and Rackspace® developed and distributed by Rackspace US, Inc.

The multi-factor illicit enumeration detection logic 108 is configured to detect illicit enumeration that is encountered by the cloud computing service 110. In an example implementation, the multi-factor illicit enumeration detection logic 108 parses object requests among request types such that each request type includes object request(s) that share a respective common attribute. Each object request requests information about an object. The object requests may be received during a designated period of time. The object requests may be directed to (e.g., received by) the cloud computing service 110. The multi-factor illicit enumeration detection logic 108 generates scores for the respective request types such that the score for each request type is based at least in part on a count of the object request(s) in the respective request type. The multi-factor illicit enumeration detection logic 108 aggregates the scores for the respective request types to provide a malicious activity score that represents a likelihood that illicit enumeration has occurred. The multi-factor illicit enumeration detection logic 108 compares the malicious activity score to a score threshold. The multi-factor illicit enumeration detection logic 108 selectively performs a remedial operation with regard to the illicit enumeration based at least in part on whether the malicious activity score is greater than or equal to the score threshold.

The multi-factor illicit enumeration detection logic 108 is shown in FIG. 1 to be separate from the cloud computing service 110 for non-limiting, illustrative purposes. It will be recognized that the multi-factor illicit enumeration detection logic 108 may be incorporated into the cloud computing service 110.

The multi-factor illicit enumeration detection logic 108 may be implemented in various ways to detect illicit enumeration, including being implemented in hardware, software, firmware, or any combination thereof. For example, the multi-factor illicit enumeration detection logic 108 may be implemented as computer program code configured to be executed in one or more processors. In another example, at least a portion of the multi-factor illicit enumeration detection logic 108 may be implemented as hardware logic/electrical circuitry. For instance, at least a portion of the multi-factor illicit enumeration detection logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The multi-factor illicit enumeration detection logic 108 is shown to be incorporated in the first server(s) 106A for illustrative purposes and is not intended to be limiting. It will be recognized that the multi-factor illicit enumeration detection logic 108 (or any portion(s) thereof) may be incorporated in any one or more of the user devices 102A-102M. For example, client-side aspects of the multi-factor illicit enumeration detection logic 108 may be incorporated in one or more of the user devices 102A-102M, and server-side aspects of multi-factor illicit enumeration detection logic 108 may be incorporated in the first server(s) 106A. In another example, the multi-factor illicit enumeration detection logic 108 may be distributed among the user devices 102A-102M. In yet another example, the multi-factor illicit enumeration detection logic 108 may be incorporated in a single one of the user devices 102A-102M. In another example, the multi-factor illicit enumeration detection logic 108 may be distributed among the server(s) 106A-106N. In still another example, the multi-factor illicit enumeration detection logic 108 may be incorporated in a single one of the servers 106A-106N.

The cloud computing service 110 is shown to be incorporated in the first server(s) 106A for illustrative purposes and is not intended to be limiting. It will be recognized that the cloud computing service 110 may be distributed among the server(s) 106A-106N. Moreover, the server(s) in which the multi-factor illicit enumeration detection logic 108 and the server(s) in which the cloud computing service 110 are incorporated may be same or different.

Figure 2:
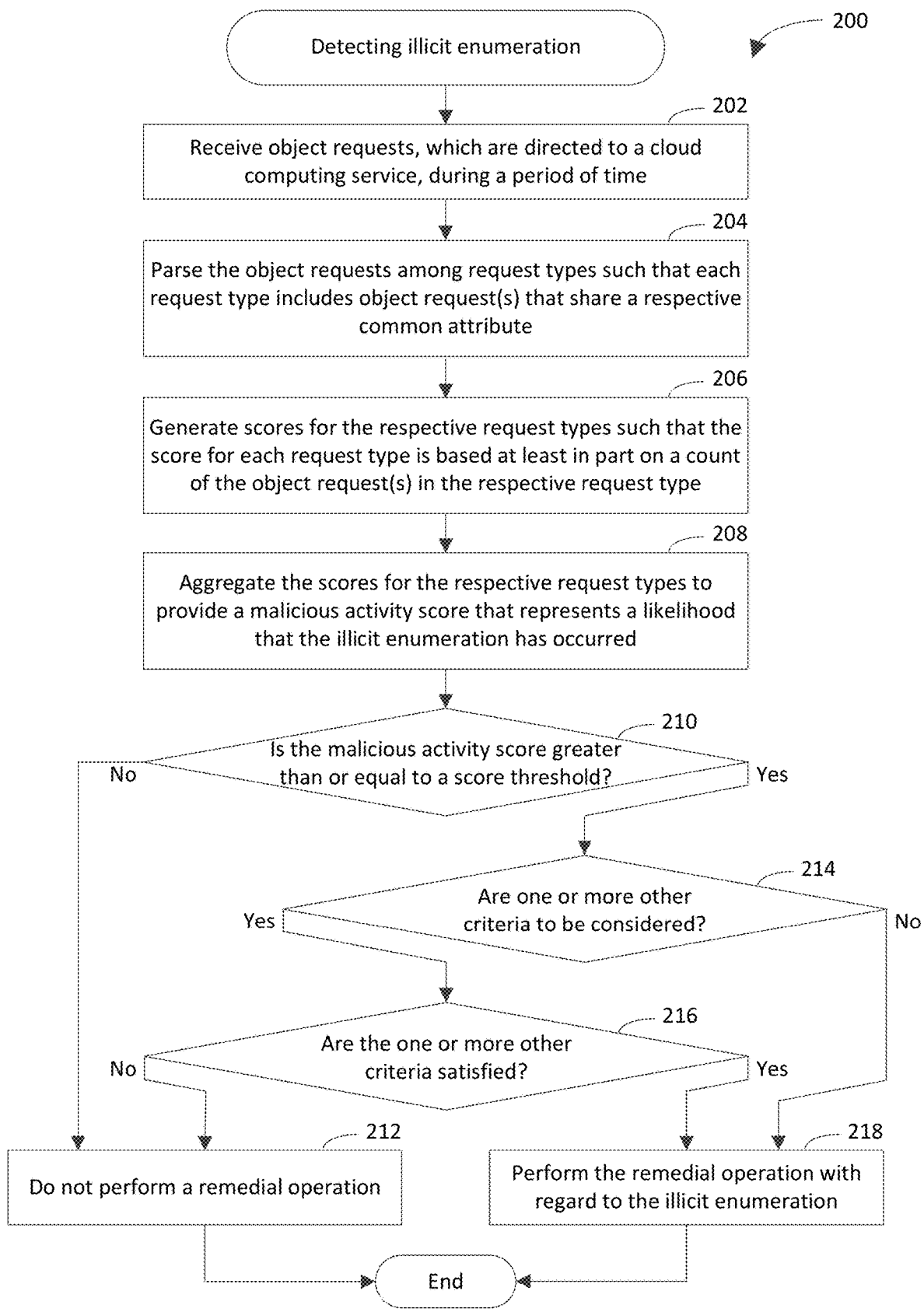
FIGS. 2-3 depict flowcharts of example methods for detecting illicit enumeration in accordance with embodiments.
Figure 3:
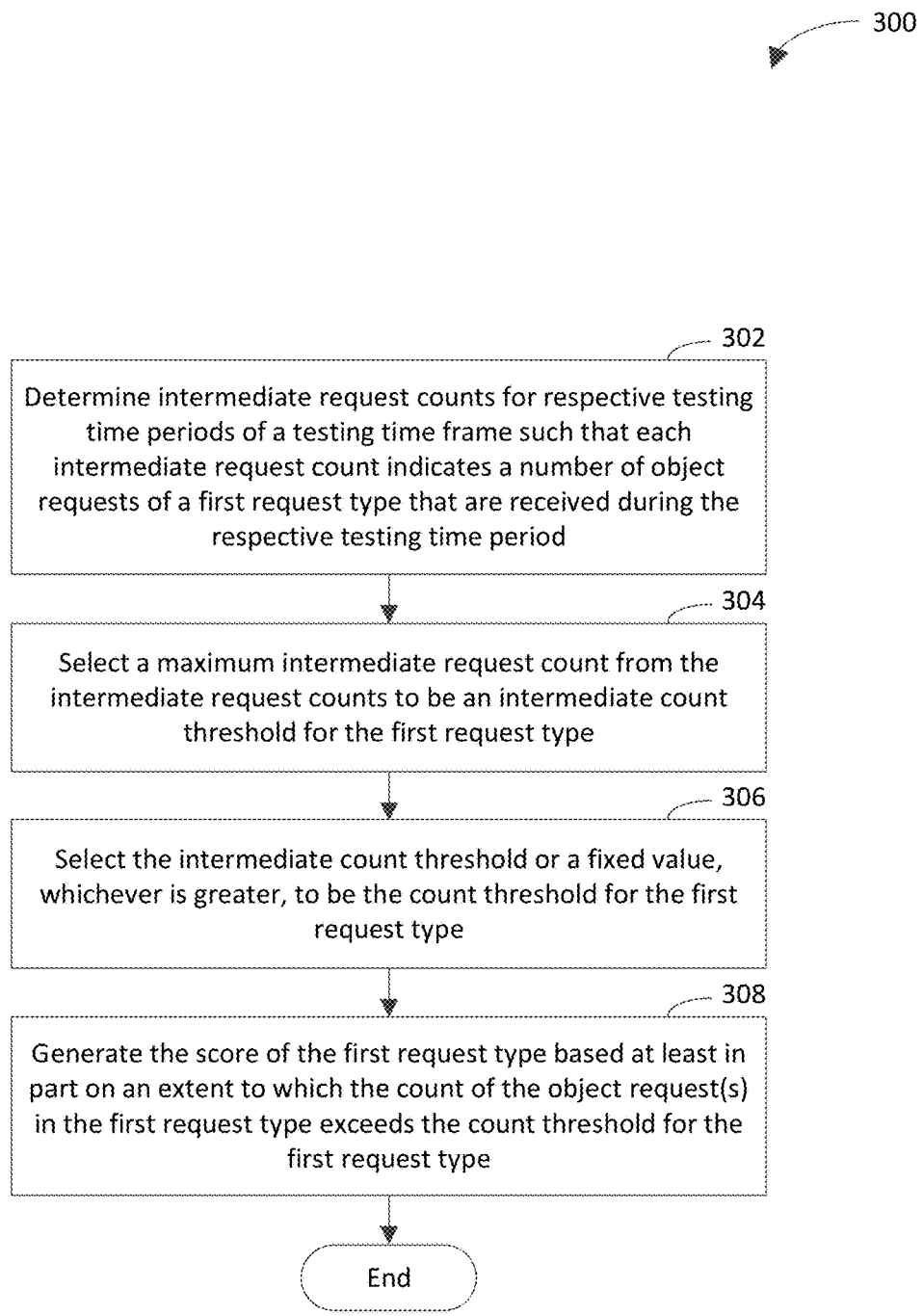
Figure 4:
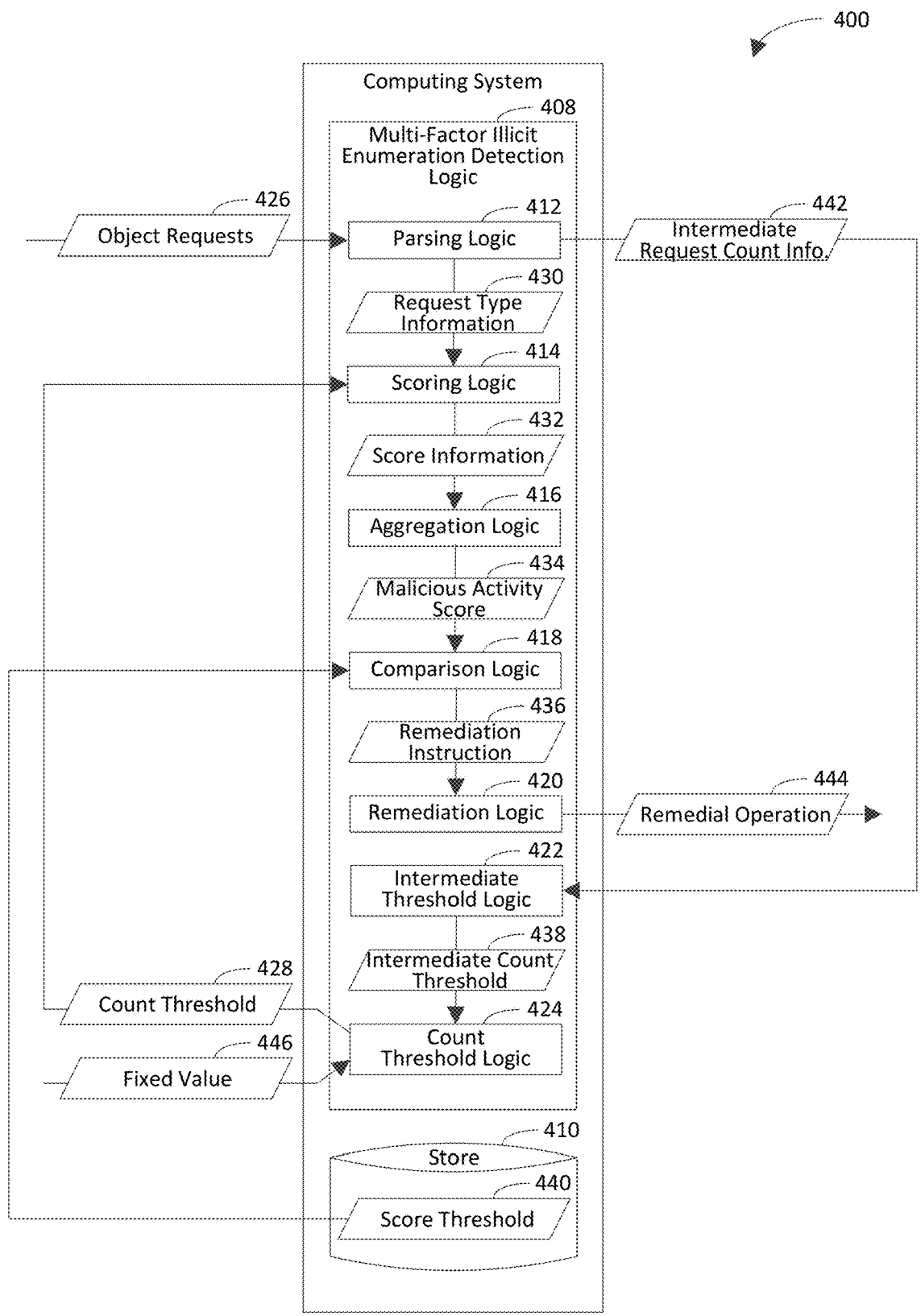
FIG. 4 is a block diagram of an example computing system in accordance with an embodiment.

FIGS. 2-3 depict flowcharts 200 and 300 of example methods for detecting illicit enumeration in accordance with embodiments. Flowcharts 200 and 300 may be performed by the first server(s) 106A, shown in FIG. 1, for example. For illustrative purposes, flowcharts 200 and 300 are described with respect to computing system 400 shown in FIG. 4, which is an example implementation of the first server(s) 106A. As shown in FIG. 4, the computing system 400 includes multi-factor illicit enumeration detection logic 408 and a store 410. The multi-factor illicit enumeration detection logic 408 includes parsing logic 412, scoring logic 414, aggregating logic 416, comparison logic 418, remediation logic 420, intermediate threshold logic 422, and count threshold logic 424. The store 410 may be any suitable type of store. One type of store is a database. For instance, the store 410 may be a relational database, an entity-relationship database, an object database, an object relational database, an extensible markup language (XML) database, etc. The store 410 is shown to store a score threshold 440 for non-limiting illustrative purposes. Further structural and operational embodiments will be apparent to persons skilled in the relevant art(s) based on the discussion regarding flowcharts 200 and 300.

As shown in FIG. 2, the method of flowchart 200 begins at step 202. In step 202, object requests, which are directed to a cloud computing service, are received during a period of time. Each object request requests information about an object. Examples of an object request include but are not limited to an authentication request and an entity information request. An authentication request is an object request that requests to authenticate a user. Examples of an authentication request include but are not limited to a login request and a registration request. A login request is an authentication request that requests to login to an object. A registration request is an authentication request that requests to register (e.g., create) an object. An entity information request is an object request that requests information about a user or a group of users. For instance, an entity information request may request access to content of an object, wherein the content includes information about a user or a group of users. For example, the entity information request may request to read the object. Examples of an object include but are not limited to a user (e.g., an account of the user), an application, a computer, and a group of users (e.g., an account of the group). In an example implementation, the parsing logic 412 receives object requests 426, which may be directed to the cloud computing service, during the period of time.

In an example embodiment, receiving the object requests at step 202 includes receiving a corpus of object requests, which are directed to the cloud computing service. Each object request in the corpus requests information about an object. In accordance with this embodiment, receiving the object requests at step 202 further includes analyzing the corpus of object requests to identify the object requests on which further processing is to be performed based at least in part on those object requests being received from a common (i.e., same) computer and/or a common account of the cloud computing service. For instance, it may be desirable to process object requests that are received from the common computer, object requests that are received from the common user account, or object requests that are received from the common user account via the common computer for purposes of detecting illicit enumeration. A computer from which an object request is received may be determined based on an internet protocol (IP) address of the computer being associated with (e.g., included in) the object request. An account from which an object request is received may be determined based on an account identifier (e.g., username) of the account being associated with the object request. Accordingly, by analyzing the IP address and/or the account identifier associated with each object request in the corpus, the object requests that are received from the common computer and/or the common account may be identified.

In a Kerberos embodiment, at least one of the object requests is a Kerberos ticket-granting ticket (TGT) request that requests a TGT.

In an LDAP embodiment, at least one of the object requests is configured in accordance with a lightweight directory access protocol (LDAP) and requests information about an object in a directory service.

In an SAMR embodiment, at least one of the object requests is configured in accordance with a security account manager remote (SAMR) protocol and requests information about an object in a security account manager.

In a NetBIOS embodiment, at least one of the object requests is configured in accordance with a network basic input/output system (NetBIOS) protocol and requests a NetBIOS name of an object.

In a DNS lookup embodiment, at least one of the object requests is a DNS lookup that requests an IP address of an object based on a domain name of the object.

In a reverse DNS lookup embodiment, at least one of the object requests is a reverse DNS lookup that requests a domain name of an object based on an IP address of the object.

In a log embodiment, at least one of the object requests requests access to an audit log and/or a sign-in log of the cloud computing service. For instance, the audit log and/or the sign-in log may have been generated by the cloud computing service.

At step 204, the object requests are parsed among request types such that each request type includes object request(s) that share a respective common attribute. Examples of a request type include but are not limited to a successful authentication type, a failed authentication type, and an entity information type. Each object request in the successful authentication type is an authentication request that results in a successful authentication of a user. For instance, each object request in the successful authentication type may result in a successful login of a user into an object or a successful registration of the user with the object. Each object request in the failed authentication type is an authentication request that results in an unsuccessful authentication of a user. For instance, each object request in the failed authentication type may unsuccessfully attempt to log a user into an object or unsuccessfully attempt to register the user with the object. Each object request in the entity information type requests information about a user of the cloud computing service or a group of users of the cloud computing service. Also, each object request in the entity information type is not an authentication request.

In an example implementation, the parsing logic 412 parses the object requests 426 among the request types such that each request type includes a subset of the object requests 426. In accordance with this implementation, each subset includes one or more of the object requests 426. Each object request may belong to a single request type, though the example embodiments are not limited in this respect. For instance, the request types may be mutually exclusive. The parsing logic 412 may generate request type information 430 to indicate (e.g., specify) each of the request types and to further indicate which of the object requests 426 are included in each request type. For instance, the request type information 430 may cross-reference each request type with the object request(s) that are included in that request type.

In an example embodiment, the request types include at least two of the following: the successful authentication type, the failed authentication type, the entity information type. For instance, the request types may include the successful authentication type, the failed authentication type, and the entity information type.

At step 206, scores for the respective request types are generated such that the score for each request type is based at least in part on a count of the object request(s) in the respective request type. In an example implementation, the scoring logic 414 generates the scores for the respective request types. The count of the object request(s) in each request type indicates (e.g., is same as) a number of the object request(s) in the respective request type. The scoring logic 414 may analyze (e.g., review) the request type information 430 to identify the request types and to identify which of the object requests 426 are included in each request type. For instance, the scoring logic 414 may use the request type information 430 to determine which of the object requests 426 are cross-referenced with each request type. The scoring logic 414 may count the object request(s) that are included in each request type, as indicated by the request type information 430. Accordingly, by analyzing the request type information 430, the scoring logic 414 may determine the count of the object request(s) in each request type. The scoring logic 414 may generate the scores for the respective request types based on (e.g., based at least in part on) the counts of the object requests for the request types that are indicated by the request type information 430. The scoring logic 414 may generate score information 432 to include the scores. The score information 432 may indicate which score corresponds to each request type. For instance, the scoring logic 414 may cross-reference the scores with the respective request types.

In an example embodiment, generating the scores for the respective request types at step 206 includes generating the score of a first request type to be one of multiple fixed values based at least in part on an extent to which the count of the object request(s) in the first request type exceeds a count threshold for the first request type. The score of the first request type is generated to be a first fixed value if the count of the object request(s) in the first request type is less than the count threshold. The score of the first request type is generated to be a second fixed value if the count of the object request(s) in the first request type is in a range between the count threshold and a first product. The score of the first request type is generated to be a third fixed value if the count of the object request(s) in the first request type is in a range between the first product and a second product. The first product is a product of the count threshold and a first factor that is greater than one. The second product is a product of the count threshold and a second factor that is greater than the first factor. In accordance with this embodiment, the request types among with the object requests are parsed include the first request type. In an example implementation, the scoring logic 414 generates the score of the first request type to be one of the fixed values based at least in part on an extent to which the count of the object request(s) in the first request type exceeds a count threshold 428 for the first request type.

In an aspect of this embodiment, the score of the first request type is generated to be a fourth fixed value if the count of the object request(s) in the first request type is greater than the second product.

In another aspect of this embodiment, generating the scores for the respective request types at step 206 includes generating the score of a second request type to be one of multiple second fixed values based at least in part on an extent to which the count of the object request(s) in the second request type exceeds a second count threshold for the second request type. The score of the second request type is generated to be a fourth fixed value if the count of the object request(s) in the second request type is less than the second count threshold. The score of the second request type is generated to be a fifth fixed value if the count of the object request(s) in the second request type is in a range between the second count threshold and a third product. The score of the second request type is generated to be a sixth fixed value if the count of the object request(s) in the second request type is in a range between the third product and a fourth product. The third product is a product of the second count threshold and a third factor that is greater than one. The fourth product is a product of the second count threshold and a fourth factor that is greater than the third factor. The count threshold for the first request type and the second count threshold for the second request type may be same or different. The first fixed value and the fourth fixed value may be same or different. The second fixed value and the fifth fixed value may be same or different. The third fixed value and the sixth fixed value may be same or different. The first factor and the third factor may be same or different. The second factor and the fourth factor may be same or different.

At step 208, the scores for the respective request types are aggregated to provide a malicious activity score that represents a likelihood that the illicit enumeration has occurred. In an example implementation, the aggregation logic 416 aggregates the scores for the respective request types to provide a malicious activity score 434. For example, the aggregation logic 416 may analyze the score information 432 to identify the scores for the respective request types. In accordance with this example, the aggregation logic 416 may analyze the score information 432 to determine which score corresponds to (e.g., is cross-referenced with) each request type.

At step 210, a determination is made whether the malicious activity score is greater than or equal to a score threshold. If the malicious activity score is greater than or equal to the score threshold, flow continues to step 214. Otherwise, flow continues to step 212. In an example implementation, the comparison logic 418 determines whether the malicious activity score 434 is greater than or equal to a score threshold 440. For instance, the comparison logic 418 may compare the malicious activity score 434 and the score threshold 440 to make the determination. The comparison logic 418 may retrieve the score threshold 440 from the store 410, though the example embodiments are not limited in this respect. For example, the score threshold may be generated dynamically (e.g., on-the-fly) based on any of a variety of factors. In accordance with this example, the score threshold 440 may not be stored by the store 410. The comparison logic 418 may generate (e.g., selectively generate) a remediation instruction 436 based at least in part on whether the malicious activity score 434 is greater than or equal to the score threshold 440. For instance, the remediation instruction 436 may indicate whether a remedial operation 444 is to be performed.

In accordance with this implementation, the comparison logic 418 determines whether the remedial operation 444 is to be performed based at least in part on whether the malicious activity score 434 is greater than or equal to the score threshold 440. The malicious activity score 434 being greater than or equal to the score threshold 440 weighs in favor of performing the remedial operation 444. The malicious activity score 434 being less than the score threshold 440 weighs against performing the remedial operation 444. The comparison logic 418 may determine whether the remedial operation 444 is to be performed further based on one or more other criteria, as described below with reference to steps 214 and 216 of flowchart 200.

In a first remediation example, the comparison logic 418 is configured to selectively generate the remediation instruction 436 based on whether the remedial operation 444 is to be performed. In accordance with this example, the comparison logic 418 is configured to generate the remediation instruction 436 based on a determination that the remedial operation 444 is to be performed, and the comparison logic 418 is further configured to not generate the remediation instruction 436 based on a determination that the remedial operation 444 is not to be performed. In further accordance with this example, the remediation instruction 436 indicates that the remedial operation 444 is to be performed. Accordingly, absence of the remedial instruction 436 may indicate that the remedial operation 444 is not to be performed.

In a second remediation example, the comparison logic 418 generates the remediation instruction 436 to indicate whether the remediation operation 444 is to be performed. For instance, the comparison logic 418 may generate the remediation instruction 436 to have a first value or a second value depending on whether the remedial operation 444 is to be performed. The first value is different from the second value. For instance, the first value may be a first binary value (e.g., "1"), and the second value may be a second binary value (e.g., "0"). The comparison logic 418 may be configured to generate the remediation instruction 436 to have the first value based on a determination that the remedial operation 444 is to be performed, and the comparison logic 418 may be further configured to generate the remediation instruction 436 to have the second value based on a determination that the remedial operation 444 is not to be performed.

At step 212, a remedial operation is not performed (e.g., with regard to the illicit enumeration). For instance, not performing the remedial operation may indicate a determination that the illicit enumeration has not occurred. Examples of a remedial operation include but are not limited to changing a password or passphrase that is required to access the cloud computing service, disabling one or more (e.g., all) of the objects about which information is requested by the object requests, deleting one or more (e.g., all) of the objects (e.g., based on a determination that the object(s) are not relevant), increasing resiliency (e.g., security) of a source computer from which the requests are received against illicit enumeration, blocking a source computer from which the requests are received from an organization and/or from accessing the cloud computing service and/or from accessing one or more (e.g., all) of the objects, and generating a notification that notifies one or more users of the cloud computing service that the illicit enumeration has occurred. Upon completion of step 212, flowchart 200 ends.

In an example implementation, the remediation logic 420 does not perform the remedial operation 444. In the first remediation example mentioned above with reference to step 210, the remediation logic 420 does not perform the remedial operation 444 based on the remediation logic 420 not receiving the remediation instruction 436. In the second remediation example mentioned above with reference to step 210, the remediation logic 420 does not perform the remedial operation 444 based on the remediation instruction 436 indicating that the remediation operation 444 is not to be performed. For instance, the remediation logic 420 may not perform the remedial operation 444 based on the remediation instruction 436 having the second value. In accordance with this example, the remediation logic 420 may analyze the remediation instruction 436 to determine that the remediation instruction 436 has the second value rather than the first value.

At step 214, a determination is made whether one or more other criteria are to be considered (e.g., for purposes of determining whether the remedial operation is to be performed). If one or more other criteria are to be considered, flow continues to step 216. Otherwise, flow continues to step 218. In an example implementation, the comparison logic 418 determines whether one or more other criteria are to be considered. For example, the comparison logic 418 may be configured to execute an algorithm to determine whether the remedial operation 444 is to be performed. In accordance with this example, the comparison logic 418 may analyze the algorithm to identify each criterion that is taken into consideration by the algorithm. By identifying each criterion that is taken into consideration by the algorithm, the comparison logic 418 may determine whether the algorithm takes into consideration at least one criterion in addition to whether the malicious activity score 434 is greater than or equal to the score threshold 440. If so, one or more criteria are to be considered. If not, no other criteria are to be considered.

In the first remediation example, if no other criteria are to be considered, the comparison logic 418 generates the remediation instruction 436. In accordance with this example, generation of the remediation instruction 436 indicates that the remedial operation 444 is to be performed. In the second remediation example, if no other criteria are to be considered, the comparison logic 418 generates the remediation instruction 436 in a manner (e.g., to have a value) that indicates that the remediation operation 444 is to be performed. For instance, the comparison logic 418 may generate the remediation instruction 436 to have the first value. In accordance with the first and second remediation examples, if one or more other criteria are to be considered, further analysis is performed at step 216.

In a criterion embodiment, an example of another criterion that may be taken into consideration is whether each of the scores for the respective request types is greater than zero. For instance, each of the scores for the respective request types being greater than zero may weight in favor of performing the remedial operation. Any one or more of the scores for the respective request types not being greater than zero (e.g., any of the scores being equal to zero) may weigh against performing the remedial operation. For example, each of the scores for the respective request types being greater than zero may be a prerequisite for performing the remedial operation.

At step 216, a determination is made whether the one or more other criteria are satisfied. If the one or more other criteria are satisfied, flow continues to step 218. Otherwise, flow continues to step 212. In an example implementation, the comparison logic 418 determines whether the one or more criteria are satisfied. For instance, each criterion may indicate that a respective value (e.g., measured or calculated value) is less than a lower threshold, greater than an upper threshold, within a designated range of values, or outside a designated range of values. The comparison logic 418 may compare the value associated with each criterion to the corresponding threshold or range of values to determine whether the criterion is satisfied.

In the first remediation example, if the one or more other criteria are satisfied, the comparison logic 418 generates the remediation instruction 436. In accordance with this example, generation of the remediation instruction 436 indicates that the remedial operation 444 is to be performed.

In further accordance with this example, if the one or more other criteria are not satisfied, the comparison logic 418 does not generate the remediation instruction 436. In further accordance with this example, not generating the remediation instruction 436 indicates that the remedial operation 444 is not to be performed.

In the second remediation example, if the one or more other criteria are satisfied, the comparison logic 418 generates the remediation instruction 436 in a manner that indicates that the remediation operation 444 is to be performed. For instance, the comparison logic 418 may generate the remediation instruction 436 to have the first value. In accordance with this example, if the one or more other criteria are not satisfied, the comparison logic 418 generates the remediation instruction 436 in a manner that indicates that the remediation operation 444 is not to be performed. For instance, the comparison logic 418 may generate the remediation instruction 436 to have the second value.

In the criterion example mentioned above with regard to step 216, determining whether one or more other criteria are to be considered at step 214 includes determining whether each of the scores for the respective request types is greater than zero. For purposes of illustration, it will be assumed that whether each of the scores for the respective request types is greater than zero is the only other criterion to be considered. Based on this assumption, if each of the scores for the respective request types is greater than zero, flow continues to step 218. Further based on this assumption, if any one or more of the scores for the respective request types is not greater than zero (e.g., any of the scores is equal to zero), flow continues to step 212.

At step 218, the remedial operation is performed with regard to the illicit enumeration. Upon completion of step 218, flowchart 200 ends. In an example implementation, the remediation logic 420 performs the remedial operation 444 with regard to the illicit enumeration. In the first remediation example, the remediation logic 420 performs the remedial operation 444 based on receipt of the remediation instruction 436. In the second remediation example, the remediation logic 420 performs the remedial operation 444 based on the remediation instruction 436 having the first value.

In some example embodiments, one or more steps 202, 204, 206, 208, 210, 212, 214, 216, and/or 218 of flowchart 200 may not be performed. Moreover, steps in addition to or in lieu of steps 202, 204, 206, 208, 210, 212, 214, 216, and/or 218 may be performed. For instance, in an example embodiment, the method of flowchart 200 may include one or more of the steps shown in flowchart 300 of FIG. 3. As shown in FIG. 3, the method of flowchart 300 begins at step 302. In step 302, intermediate request counts for respective testing time periods of a testing time frame are determined such that each intermediate request count indicates a number of object requests of a first request type that are received during the respective testing time period. The request types among which the object requests are parsed at step 204 include the first request type. In an example implementation, the parsing logic 412 determines the intermediate request counts for the respective testing time periods. The parsing logic 412 may generate intermediate request count information 442, which indicates (e.g., includes) the intermediate request counts for the respective testing time periods. The intermediate request count information 442 may correlate the intermediate request counts and the respective testing time periods. For instance, the intermediate request count information 442 may cross-reference the intermediate request counts to the respective testing time periods.

At step 304, a maximum intermediate request count is selected from the intermediate request counts to be an intermediate count threshold for the first request type. In an example implementation, the intermediate threshold logic 422 selects the maximum intermediate request count from the intermediate request counts, which are indicated by the intermediate request count information 442, to be an intermediate count threshold 438 for the first request type. For example, the intermediate threshold logic 422 may analyze the intermediate request counts to determine which of the intermediate request counts is no less than any of the other intermediate request counts (e.g., that is greater than each of the other intermediate request counts). In accordance with this example, the intermediate threshold logic 422 may select the intermediate request count that is no less than any of the other intermediate request counts to serve as the intermediate count threshold 438 for the first request type.

It will be recognized that the intermediate count threshold for the first request type may be determined (e.g., generated or selected) in any of a variety of ways. For instance, in some example embodiments, the intermediate count threshold for the first request type need not necessarily be the maximum intermediate request count selected from the intermediate request counts. A different mathematical operation may be performed with regard to (e.g., on) the intermediate request counts to determine the intermediate count threshold for the first request type. For example, the intermediate count threshold may be an average of the intermediate request counts; the average of the intermediate request counts plus one standard deviation; the average of the intermediate request counts plus two standard deviations; the average of the intermediate request counts plus three standard deviations; a median of the intermediate request counts; the median of the intermediate request counts plus an offset (e.g., a fixed offset); or a designated percentile (e.g., 95th, 97th, 98th, or 99th percentile) of the intermediate request counts.

At step 306, the intermediate count threshold or a fixed value, whichever is greater, is selected to be the count threshold for the first request type. For example, the fixed value may be a predefined fixed value. In accordance with this example, the predefined fixed value may be defined prior to selecting the maximum intermediate request count to be the intermediate count threshold for the first request type at step 304. The fixed value may be utilized to increase an accuracy and/or a precision associated with an illicit enumeration determination if the intermediate count threshold is deemed to be too low to serve as a reliable count threshold. For example, if the intermediate count threshold is less than the fixed value, the intermediate count threshold may be deemed to be unreliable for purposes of serving as the count threshold for the first request type. In accordance with this example, the fixed value may be selected in lieu of the intermediate count threshold to serve as the count threshold for the first request type. By selecting the fixed value in this example, a likelihood of error associated with a determination regarding illicit enumeration may be reduced. In an example implementation, the count threshold logic 424 selects the intermediate count threshold 438 or a fixed value 446, whichever is greater, to be the count threshold 428 for the first request type.

At step 308, the score of the first request type is generated based at least in part on an extent to which the count of the object request(s) in the first request type exceeds the count threshold for the first request type. For instance, generating the scores for the respective request types at step 206 of flowchart 200 may include generating the score of the first request type at step 308. In an example implementation, the scoring logic 414 generates the score of the first request type based at least in part on an extent to which the count of the object request(s) in the first request type exceeds the count threshold 428 for the first request type. For instance, the count of the object request(s) in the first request type may be a first numerical value, and the count threshold 428 may be a second numerical value. The scoring logic 414 may subtract the second numerical value from the first numerical value to determine a delta (e.g., difference) value. The scoring logic 414 may generate the score of the first request type to correspond to the delta value. For example, the scoring logic 414 may generate the score of the first request type to be proportional (e.g., directly proportional, linearly proportional, or exponentially proportional) to the delta value.

It will be recognized that steps 302, 304, 306, and 308 may be performed for any one or more (e.g., each) of the request types.

It will be recognized that the computing system 400 may not include one or more of the multi-factor illicit enumeration detection logic 408, the store 410, the parsing logic 412, the scoring logic 414, the aggregating logic 416, the comparison logic 418, the remediation logic 420, the intermediate threshold logic 422, and/or the count threshold logic 424. Furthermore, the computing system 400 may include components in addition to or in lieu of the multi-factor illicit enumeration detection logic 408, the store 410, the parsing logic 412, the scoring logic 414, the aggregating logic 416, the comparison logic 418, the remediation logic 420, the intermediate threshold logic 422, and/or the count threshold logic 424.

In another example embodiment, the request types among which the object requests are parsed at step 204 of flowchart 200 include a first request type. In accordance with this embodiment, the first request type includes multiple object requests. In further accordance with this embodiment, generating the scores for the respective request types at step 206 of flowchart 200 may include one or more of the steps shown in flowchart 500 of FIG. 5. Flowchart 500 may be performed by the scoring logic 414, shown in FIG. 4, for example. For illustrative purposes, flowchart 500 is described with respect to scoring logic 600 shown in FIG. 6, which is an example implementation of the scoring logic 414. As shown in FIG. 6, the scoring logic 600 includes weight selection logic 652 and weight aggregation logic 654. Further structural and operational embodiments will be apparent to persons skilled in the relevant art(s) based on the discussion regarding flowchart 500.

Figure 5:
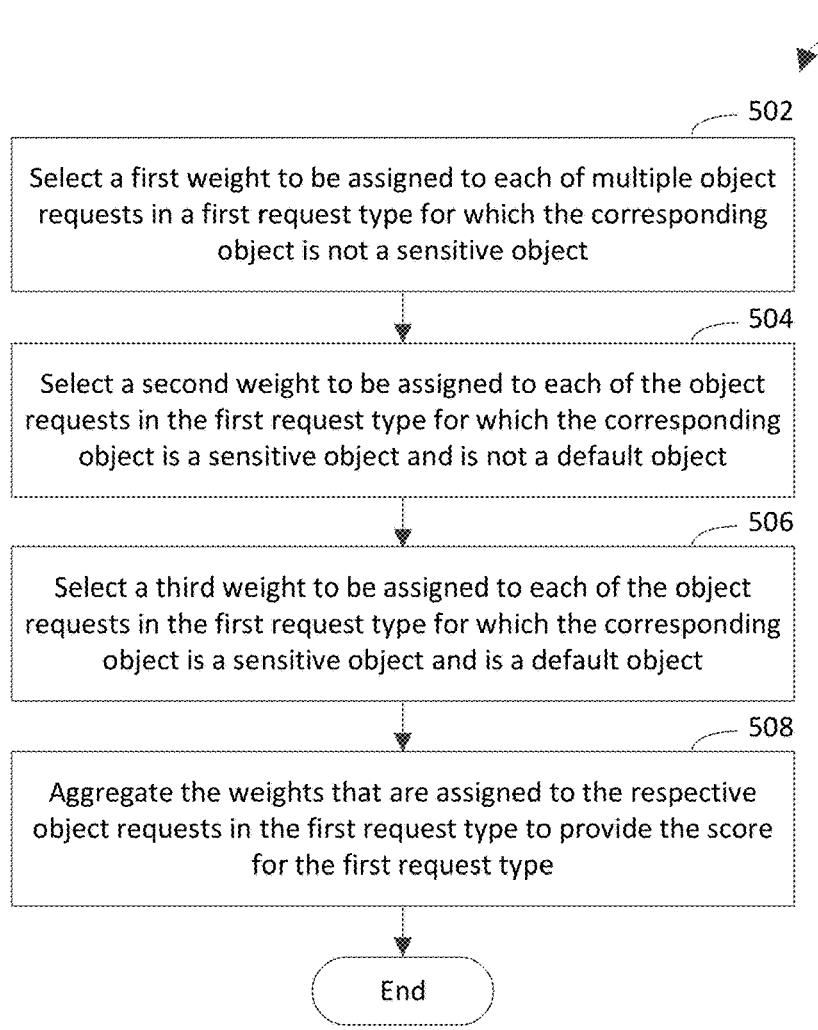
FIG. 5 depicts a flowchart of an example method for generating a score for a first request type in accordance with an embodiment.
Figure 6:
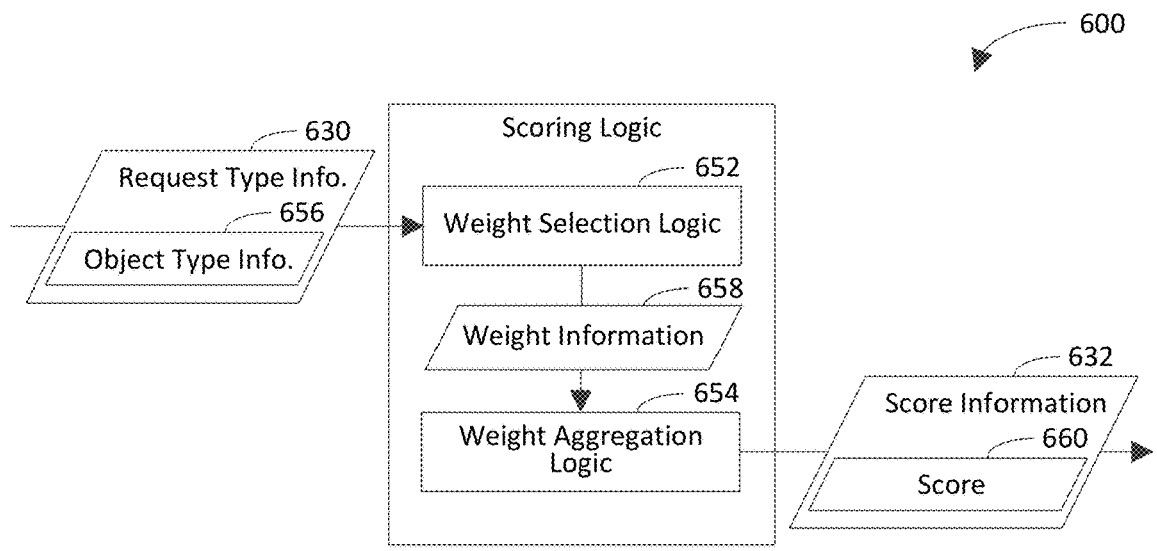
FIG. 6 is a block diagram of an example implementation of score logic shown in FIG. 4 in accordance with an embodiment.

As shown in FIG. 5, the method of flowchart 500 begins at step 502. In step 502, a first weight is selected to be assigned to each of multiple object requests in a first request type for which the corresponding object is not a sensitive object. The request types among which the object requests are parsed at step 204 include the first request type. A sensitive object is an object that represents a person having a security designation that is greater than or equal to a security threshold. For example, the sensitive object may represent an administrator, a C-level executive (e.g., chief executive officer (CEO) or chief financial officer (CFO)), someone with an extent (e.g., number, depth) of permissions that is greater than or equal to a permission threshold, someone authorized to access sensitive documents, or a person having an account tagged by a customer of the cloud computing service as being sensitive.

In an example implementation, the weight selection logic 652 selects the first weight to be assigned to each of the object requests in the first request type for which the corresponding object is not a sensitive object. For instance, the weight selection logic 652 may analyze request type information 630 to identify object type information 656 therein. The object type information 656 may indicate whether each of the objects to which the respective object requests correspond is a sensitive object. The weight selection logic 652 may assign the first weight to each of the object requests in the first request type that is not indicated by the object type information 656 to correspond a sensitive object. The weight selection logic 652 may not assign the first weight to each of the object requests in the first request type that is indicated by the object type information 656 to correspond a sensitive object.

In an example of this implementation, the object type information 656 may associate sensitivity indicators with the respective objects to which the respective object requests in the first request type correspond. Each sensitivity indicator may have a first value or a second value. A sensitivity indicator that has the first value being associated with an object indicates that the object is a sensitive object. A sensitivity indicator that has the second value being associated with an object indicates that the object is not a sensitive object. In accordance with this example, the weight selection logic 652 may analyze the object type information 656 to determine which of the objects to which the respective object requests in the first request type correspond are associated with a sensitivity indicator that has the first value and which of the objects to which the respective object requests in the first request type correspond are associated with a sensitivity indicator that has the second value. In further accordance with this example, the weight selection logic 652 may assign the first weight to each of the object requests in the first request type for which the sensitivity indicator of the corresponding object has the second value. In further accordance with this example, the weight selection logic 652 may not assign the first weight to each of the object requests in the first request type for which the sensitivity indicator of the corresponding object has the first value.

At step 504, a second weight is selected to be assigned to each of the object requests in the first request type for which the corresponding object is a sensitive object and is not a default object. The second weight may be greater than the first weight. A default object is an object that is provided by the could computing service by default (e.g., having a default function). For example, the default object may include designated administrators that are identified by the cloud computing service by default. In accordance with this example, the default object may be a domain administrator, a schema key administrator, an enterprise administrator, or a global administrator. In an example implementation, the weight selection logic 652 selects the second weight to be assigned to each of the object requests in the first request type for which the corresponding object is a sensitive object and is not a default object. For instance, the object type information 656 may further indicate whether each of the objects to which the respective object requests correspond is a default object. The weight selection logic 652 may assign the second weight to each of the object requests in the first request type that is indicated by the object type information 656 to correspond a sensitive object and that is not indicated by the object type information 656 to correspond a default object. The weight selection logic 652 may not assign the second weight to each of the object requests in the first request type that is not indicated by the object type information 656 to correspond a sensitive object and/or that is indicated by the object type information 656 to correspond a default object.

In an example of this implementation, the object type information 656 may associate default indicators with the respective objects to which the respective object requests in the first request type correspond. Each default indicator may have a third value or a fourth value. A default indicator that has the third value being associated with an object indicates that the object is a default object. A default indicator that has the fourth value being associated with an object indicates that the object is not a default object. In accordance with this example, the weight selection logic 652 may analyze the object type information 656 to determine which of the objects to which the respective object requests in the first request type correspond are associated with a default indicator that has the third value and which of the objects to which the respective object requests in the first request type correspond are associated with a default indicator that has the fourth value. In further accordance with this example, the weight selection logic 652 may assign the second weight to each of the object requests in the first request type for which the corresponding object is associated with a sensitivity indicator having the first value and is further associated with a default indicator having the fourth value. In further accordance with this example, the weight selection logic 652 may not assign the second weight to each of the object requests in the first request type for which the corresponding object is associated with a sensitivity indicator having the second value and/or is associated with a default indicator having the third value.

At step 506, a third weight is selected to be assigned to each of the object requests in the first request type for which the corresponding object is a sensitive object and is a default object. The third weight may be greater than the second weight. For example, the first weight may equal one; the second weight may equal two, and the third weight may equal three. These example weights are provided for non-limiting, illustrative purposes. It will be recognized that the weights may be any suitable values. In an example implementation, the weight selection logic 652 selects the third weight to be assigned to each of the object requests in the first request type for which the corresponding object is a sensitive object and is a default object. For instance, the weight selection logic 652 may assign the third weight to each of the object requests in the first request type that is indicated by the object type information 656 to correspond a sensitive object and that is indicated by the object type information 656 to correspond a default object. The weight selection logic 652 may not assign the third weight to each of the object requests in the first request type that is not indicated by the object type information 656 to correspond a sensitive object and/or that is not indicated by the object type information 656 to correspond a default object.

In an example of this implementation, the weight selection logic 652 may assign the third weight to each of the object requests in the first request type for which the corresponding object is associated with a sensitivity indicator having the first value and is further associated with a default indicator having the third value. In accordance with this example, the weight selection logic 652 may not assign the third weight to each of the object requests in the first request type for which the corresponding object is associated with a sensitivity indicator having the second value and/or is associated with a default indicator having the fourth value.

At step 508, the weights that are assigned to the respective object requests in the first request type are aggregated to provide the score for the first request type. In an example implementation, the weight aggregation logic 654 aggregates the weights that are assigned to the respective object requests in the first request type to provide a score 660 for the first request type. For example, the weight selection logic 652 may generate weight information 658 to indicate the weights that are assigned to the respective object requests in the first request type. In accordance with this example, the weight aggregation logic 654 may analyze the weight information 658 to determine the weights that are assigned to the respective object requests in the first request type. In further accordance with this example, the weight aggregation logic 654 may perform the aggregation to generate the score 660 for the first request type based on the analysis of the weight information 658. The score 660 may be included in score information 632, which indicates which score corresponds to each of the request types among which the object requests are parsed at step 204 of flowchart 200.

It will be recognized that the scoring logic 600 may not include one or more of the weight selection logic 652 and/or the weight aggregation logic 654. Furthermore, the scoring logic 600 may include components in addition to or in lieu of the weight selection logic 652 and/or the weight aggregation logic 654.

Following is a description of an example implementation in the context of an on-prem environment. This implementation will be discussed with reference to the following types of events: (1) Kerberos traffic or Windows® event 4769; (2) SAMR traffic; and (3) LDAP event ID 1644 or Windows® event trace (ETW). Each event constitutes an object request. The object requests are to be parsed among three request types: (1) successful Kerberos TGT requests (referred to below as "the first request type"); (2) unsuccessful Kerberos TGT requests (referred to below as "the second request type"); and (3) LDAP requests and SAMR requests that request information regarding objects that are targeted by the Kerberos TGT requests (referred to below as "the third request type"). These example request types are provided for non-limiting, illustrative purposes. It will be recognized that any suitable request types and any suitable number of such request types may be used. An aggregation key and a threshold key are used for purposes of identifying relevant object requests. The aggregation key is based on an IP address of a common computer and an account identifier (ID) of a common account. The threshold key is based on an account ID of a common account and is not based on an IP address of a common computer.

A learning period of one week is used in this implementation. The learning period may be configured in any suitable manner. For purposes of illustration, the learning period in this implementation is configured such that object requests received during specified time increments (e.g., 10-minute increments or 20-minute increments) are taken into consideration for parsing among the request types. The specified time increments are separated by a designated amount of time (e.g., 30 minutes or one hour) to accommodate for the possibility that illicit enumeration may occur during any specified time increment. For example, object requests received during a first specified time increment are taken into consideration; object requests received during a first designated period following the first specified time increment are not taken into consideration; object requests received during a second specified time increment, which follows the first designated period, are taken into consideration; object requests received during a second designated period following the second specified time increment are not taken into consideration, and so on until the end of the one-week learning period is reached. The relevant object requests for the learning period share a common aggregation key, meaning that the relevant object requests for the learning period are received from a common account and a common computer.

During the learning period, a sensor on a domain controller of a computing system parses every Kerberos TGT request from type S4U2Self request (or Windows® event 4769) that is associated with the aggregation key and stores a first intermediate request count of the successful TGT requests associated with the aggregation key for each of the specified time increments and further stores a second intermediate request count of the unsuccessful TGT requests associated with the aggregation key for each of the specified time increments. Each unsuccessful Kerberos TGT request is a Kerberos TGT request for which a Kerberos error code "Principal unknown" was returned. Each successful Kerberos TGT request is a Kerberos TGT request for which the aforementioned Kerberos error code was not received. Each unsuccessful Kerberos TGT request indicates an account that does not exist in the organization (i.e., that is not identifiable by the cloud computing service).

After the learning period, a maximum of the first intermediate request counts for the specified time periods is selected to serve as an intermediate threshold for the first request type, and a maximum of the second intermediate request counts for the specified time periods is selected to serve as an intermediate threshold for the second request type. The intermediate threshold for the first type or a fixed value of 10, whichever is greater, is selected to serve as the count threshold for the first request type. The intermediate threshold for the second type or the fixed value of 10, whichever is greater, is selected to serve as the count threshold for the second request type. The threshold key is associated with the count threshold for the first request type and the count threshold for the second request type.

In accordance with this implementation, the Kerberos TGT requests from type S4U2Self, the SAMR traffic, and the LDAP events from the same specified time intervals are processed and aggregated based on the aggregation key (i.e., same computer and same account). A score for the first request type is calculated based on the number of successful Kerberos TGT requests. A score for the second request type is calculated based on the number of unsuccessful Kerberos TGT requests. The score for each of the first and second request types is calculated based on the following statements:

If x<Threshold, then score=0.
If Threshold<x<2*Threshold, then score=1.
If 2*Threshold<x<5*Threshold, then score=2.
If 5*Threshold<x, then score=3.

When calculating the score for the first request type, x is the number of successful Kerberos TGT requests, and the Threshold is the count threshold for the first request type. When calculating the score for the second request type, x is the number of unsuccessful Kerberos TGT requests, and the Threshold is the count threshold for the second request type.

In further accordance with this implementation, if the number of successful Kerberos TGT requests is not equal to zero, a set of all the accounts and the groups to which the account are members is determined. It will be recognized that subgroups may be determined recursively. Accordingly, the set may include subgroups of the groups, subgroups of the subgroups, and so on. The LDAP Windows events and the SAMR traffic for the queries made to objects in the set are processed, and a new set of accounts and groups that were queried using LDAP or SAMR is created. A score for the third request type is determined based on the number of objects queried. Each object that is not a sensitive object or a default object is assigned a first value of one. Each object that is a sensitive object and that is not a default object is assigned a second value of two. Each object that is a sensitive object and is a default object is assigned a third value of three. The values of the respective objects are summed to provide the score for the third request type.

In further accordance with this implementation, the scores for the first, second, and third request types are summed to provide a malicious activity score. A remedial operation is performed if the malicious activity score is greater than ten and further if each of the scores for the first, second, and third request types is greater than zero. The remedial operation is not performed if the malicious activity is not greater than ten and/or if the score for any of the first, second, and third request types is not greater than zero. For instance, the remedial operation may include informing an entity of illicit enumeration, recording the accounts corresponding to the successful Kerberos TGT requests and the accounts corresponding to the unsuccessful Kerberos TGT requests, etc.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the multi-factor illicit enumeration detection logic 108, the multi-factor illicit enumeration detection logic 408, the parsing logic 412, the scoring logic 414, the aggregating logic 416, the comparison logic 418, the remediation logic 420, the intermediate threshold logic 422, the count threshold logic 424, the weight selection logic 652, the weight aggregation logic 654, flowchart 200, flowchart 300, and/or flowchart 500 may be implemented in hardware, software, firmware, or any combination thereof.

For example, any one or more of the multi-factor illicit enumeration detection logic 108, the multi-factor illicit enumeration detection logic 408, the parsing logic 412, the scoring logic 414, the aggregating logic 416, the comparison logic 418, the remediation logic 420, the intermediate threshold logic 422, the count threshold logic 424, the weight selection logic 652, the weight aggregation logic 654, flowchart 200, flowchart 300, and/or flowchart 500 may be implemented, at least in part, as computer program code configured to be executed in one or more processors.

In another example, any one or more of the multi-factor illicit enumeration detection logic 108, the multi-factor illicit enumeration detection logic 408, the parsing logic 412, the scoring logic 414, the aggregating logic 416, the comparison logic 418, the remediation logic 420, the intermediate threshold logic 422, the count threshold logic 424, the weight selection logic 652, the weight aggregation logic 654, flowchart 200, flowchart 300, and/or flowchart 500 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments (A1) An example system (FIG. 1, 102A-102M or 106A-106N; FIG. 4, 400) to detect illicit enumeration comprises memory (FIG. 7, 704, 708, 710) and one or more processors (FIG. 7, 702) coupled to the memory. The one or more processors are configured to parse (FIG. 2, 204) a plurality of object requests (FIG. 4, 426), which are received at a cloud computing service (FIG. 1, 110) during a period of time, among a plurality of request types such that each request type includes one or more object requests that share a respective common attribute. Each object request requests information about an object. The one or more processors are further configured to generate (FIG. 2, 206) a plurality of scores for the plurality of respective request types such that the score for each request type is based at least in part on a count of the one or more object requests in the respective request type. The one or more processors are further configured to aggregate (FIG. 2, 208) the plurality of scores for the plurality of respective request types to provide a malicious activity score (FIG. 4, 434) that represents a likelihood that the illicit enumeration has occurred. The one or more processors are further configured to compare (FIG. 2, 210) the malicious activity score to a score threshold (FIG. 4, 440). The one or more processors are further configured to selectively perform (FIG. 2, 212, 218) a remedial operation (FIG. 4, 444) with regard to the illicit enumeration based at least in part on whether the malicious activity score is greater than or equal to the score threshold.

(A2) In the example system of A1, wherein the one or more processors are configured to: analyzing a corpus of object requests that are received at the cloud computing service to identify the plurality of object requests based at least in part on the plurality of object requests being received from at least one of a common computer or a common account of the cloud computing service, each object request in the corpus requesting information about an object.

(A3) In the example system of any of A1-A2, wherein the plurality of request types includes at least two of the following: a successful authentication type, wherein each object request in the successful authentication type is an authentication request that results in a successful authentication of a user; a failed authentication type, wherein each object request in the failed authentication type is an authentication request that results in an unsuccessful authentication of a user; an entity information type, wherein each object request in the entity information type requests information about a user of the cloud computing service or a group of users of the cloud computing service, and wherein each object request in the entity information type is not an authentication request.

(A4) In the example system of any of A1-A3, wherein the one or more processors are configured to: determine a plurality of intermediate request counts for a plurality of respective testing time periods of a testing time frame such that each intermediate request count indicates a number of object requests of a first request type that are received during the respective testing time period; select a maximum intermediate request count from the plurality of intermediate request counts to be an intermediate count threshold for the first request type; select the intermediate count threshold or a fixed value, whichever is greater, to be the count threshold for the first request type; and generate the score of the first request type based at least in part on an extent to which the count of the one or more object requests in the first request type exceeds the count threshold for the first request type.

(A5) In the example system of any of A1-A4, wherein the one or more processors are configured to: generate the score of a first request type to be one of a plurality of fixed values based at least in part on an extent to which the count of the one or more object requests in the first request type exceeds a count threshold for the first request type. The score is a first fixed value if the count of the one or more object requests in the first request type is less than the count threshold. The score is a second fixed value if the count of the one or more object requests in the first request type is in a range between the count threshold and a first product. The score is a third fixed value if the count of the one or more object requests in the first request type is in a range between the first product and a second product. The first product is a product of the count threshold and a first factor that is greater than one. The second product is a product of the count threshold and a second factor that is greater than the first factor.

(A6) In the example system of any of A1-A5, wherein the score is a fourth fixed value if the count of the one or more object requests in the first request type is greater than the second product.

(A7) In the example system of any of A1-A6, wherein the one or more processors are configured to: generate the score of a second request type to be one of a plurality of second fixed values based at least in part on an extent to which the count of the one or more object requests in the second request type exceeds a second count threshold for the second request type. The score is a fourth fixed value if the count of the one or more object requests in the second request type is less than the second count threshold. The score is a fifth fixed value if the count of the one or more object requests in the second request type is in a range between the second count threshold and a third product. The score is a sixth fixed value if the count of the one or more object requests in the second request type is in a range between the third product and a fourth product. The third product is a product of the second count threshold and a third factor that is greater than one. The fourth product is a product of the second count threshold and a fourth factor that is greater than the third factor.

(A8) In the example system of any of A1-A7, wherein a first request type of the plurality of request types includes multiple object requests; and wherein the one or more processors are configured to: select a first weight to be assigned to each of the object requests in the first request type for which the corresponding object is not a sensitive object; select a second weight to be assigned to each of the object requests in the first request type for which the corresponding object is a sensitive object and is not a default object; select a third weight to be assigned to each of the object requests in the first request type for which the corresponding object is a sensitive object and is a default object; and aggregate the weights that are assigned to the respective object requests in the first request type to provide the score for the first request type.

(A9) In the example system of any of A1-A8, wherein the one or more processors are configured to: selectively perform the remedial operation with regard to the illicit enumeration further based at least in part on whether each of the plurality of scores for the plurality of respective request types is greater than zero.

(A10) In the example system of any of A1-A9, wherein the plurality of object requests includes a Kerberos ticket-granting ticket (TGT) request that requests a TGT.

(A11) In the example system of any of A1-A10, wherein the plurality of object requests includes an object request that is configured in accordance with a lightweight directory access protocol (LDAP) and that requests information about an object in a directory service.

(A12) In the example system of any of A1-A11, wherein the plurality of object requests includes an object request that is configured in accordance with a security account manager remote (SAMR) protocol and that requests information about an object in a security account manager.

(A13) In the example system of any of A1-A12, wherein the plurality of object requests includes an object request that is configured in accordance with a network basic input/output system (NetBIOS) protocol and that requests a NetBIOS name of an object.

(A14) In the example system of any of A1-A13, wherein the plurality of object requests includes at least one of: a DNS lookup that requests an IP address of an object based on a domain name of the object; or a reverse DNS lookup that requests a domain name of an object based on an IP address of the object.

(A15) In the example system of any of A1-A14, wherein the plurality of object requests includes an object request that requests access to at least one of an audit log or a sign-in log of the cloud computing service.

(B1) An example method of detecting illicit enumeration, the method implemented by a computing system (FIG. 1, 102A-102M or 106A-106N; FIG. 4, 400), comprises: receiving (FIG. 2, 202) a plurality of object requests (FIG. 4, 426), which are directed to a cloud computing service (FIG. 1, 110), during a period of time, each object request requesting information about an object; parsing (FIG. 2, 204) the plurality of object requests among a plurality of request types such that each request type includes one or more object requests that share a respective common attribute; generating (FIG. 2, 206) a plurality of scores for the plurality of respective request types such that the score for each request type is based at least in part on a count of the one or more object requests in the respective request type; aggregating (FIG. 2, 208) the plurality of scores for the plurality of respective request types to provide a malicious activity score (FIG. 4, 434) that represents a likelihood that the illicit enumeration has occurred; comparing (FIG. 2, 210) the malicious activity score to a score threshold (FIG. 4, 440); and selectively performing (FIG. 2, 212, 218) a remedial operation (FIG. 4, 444) with regard to the illicit enumeration based at least in part on whether the malicious activity score is greater than or equal to the score threshold.

(B2) In the method of B1, wherein receiving the plurality of object requests comprises: receiving a corpus of object requests, which are directed to the cloud computing service, each object request requesting information about an object; and analyzing the corpus of object requests to identify the plurality of object requests based at least in part on the plurality of object requests being received from at least one of a common computer or a common account of the cloud computing service.

(B3) In the method of any of B1-B2, wherein the plurality of request types includes at least two of the following: a successful authentication type, wherein each object request in the successful authentication type is an authentication request that results in a successful authentication of a user; a failed authentication type, wherein each object request in the failed authentication type is an authentication request that results in an unsuccessful authentication of a user; an entity information type, wherein each object request in the entity information type requests information about a user of the cloud computing service or a group of users of the cloud computing service, and wherein each object request in the entity information type is not an authentication request.

(B4) In the method of any of B1-B3, further comprising: determining a plurality of intermediate request counts for a plurality of respective testing time periods of a testing time frame such that each intermediate request count indicates a number of object requests of a first request type that are received during the respective testing time period; selecting a maximum intermediate request count from the plurality of intermediate request counts to be an intermediate count threshold for the first request type; and selecting the intermediate count threshold or a fixed value, whichever is greater, to be the count threshold for the first request type; wherein generating the plurality of scores for the plurality of respective request types comprises: generating the score of the first request type based at least in part on an extent to which the count of the one or more object requests in the first request type exceeds the count threshold for the first request type.

(B5) In the method of any of B1-B4, wherein generating the plurality of scores for the plurality of respective request types comprises: generating the score of a first request type to be one of a plurality of fixed values based at least in part on an extent to which the count of the one or more object requests in the first request type exceeds a count threshold for the first request type. The score is a first fixed value if the count of the one or more object requests in the first request type is less than the count threshold. The score is a second fixed value if the count of the one or more object requests in the first request type is in a range between the count threshold and a first product. The score is a third fixed value if the count of the one or more object requests in the first request type is in a range between the first product and a second product. The first product is a product of the count threshold and a first factor that is greater than one. The second product is a product of the count threshold and a second factor that is greater than the first factor.

(B6) In the method of any of B1-B5, wherein the score is a fourth fixed value if the count of the one or more object requests in the first request type is greater than the second product.

(B7) In the method of any of B1-B6, wherein generating the plurality of scores for the plurality of respective request types comprises: generating the score of a second request type to be one of a plurality of second fixed values based at least in part on an extent to which the count of the one or more object requests in the second request type exceeds a second count threshold for the second request type. The score is a fourth fixed value if the count of the one or more object requests in the second request type is less than the second count threshold. The score is a fifth fixed value if the count of the one or more object requests in the second request type is in a range between the second count threshold and a third product. The score is a sixth fixed value if the count of the one or more object requests in the second request type is in a range between the third product and a fourth product. The third product is a product of the second count threshold and a third factor that is greater than one. The fourth product is a product of the second count threshold and a fourth factor that is greater than the third factor.

(B8) In the method of any of B1-B7, wherein a first request type of the plurality of request types includes multiple object requests; and wherein generating the plurality of scores for the plurality of respective request types comprises: selecting a first weight to be assigned to each of the object requests in the first request type for which the corresponding object is not a sensitive object; selecting a second weight to be assigned to each of the object requests in the first request type for which the corresponding object is a sensitive object and is not a default object; selecting a third weight to be assigned to each of the object requests in the first request type for which the corresponding object is a sensitive object and is a default object; and aggregating the weights that are assigned to the respective object requests in the first request type to provide the score for the first request type.

(B9) In the method of any of B1-B8, wherein selectively performing the remedial operation comprises: selectively performing the remedial operation with regard to the illicit enumeration further based at least in part on whether each of the plurality of scores for the plurality of respective request types is greater than zero.

(B10) In the method of any of B1-B9, wherein receiving the plurality of object requests comprises: receiving a Kerberos ticket-granting ticket (TGT) request that requests a TGT.

(B11) In the method of any of B1-B10, wherein receiving the plurality of object requests comprises: receiving an object request that is configured in accordance with a lightweight directory access protocol (LDAP) and that requests information about an object in a directory service.

(B12) In the method of any of B1-B11, wherein receiving the plurality of object requests comprises: receiving an object request that is configured in accordance with a security account manager remote (SAMR) protocol and that requests information about an object in a security account manager.

(B13) In the method of any of B1-B12, wherein receiving the plurality of object requests comprises: receiving an object request that is configured in accordance with a network basic input/output system (NetBIOS) protocol and that requests a NetBIOS name of an object.

(B14) In the method of any of B1-B13, wherein receiving the plurality of object requests comprises at least one of: receiving a DNS lookup that requests an IP address of an object based on a domain name of the object; or receiving a reverse DNS lookup that requests a domain name of an object based on an IP address of the object.

(B15) In the method of any of B1-B14, wherein receiving the plurality of object requests comprises: receiving an object request that requests access to at least one of an audit log or a sign-in log of the cloud computing service.

(C1) An example computer program product (FIG. 7, 718, 722) comprising a computer-readable storage medium having instructions recorded thereon for enabling a processor-based system (FIG. 1, 102A-102M or 106A-106N; FIG. 4, 400) to perform operations to detect illicit enumeration, the operations comprising: parsing (FIG. 2, 204) a plurality of object requests (FIG. 4, 426), which are directed to a cloud computing service (FIG. 1, 110) and which are received during a period of time, among a plurality of request types such that each request type includes one or more object requests that share a respective common attribute, each object request requesting information about an object; generating (FIG. 2, 206) a plurality of scores for the plurality of respective request types such that the score for each request type is based at least in part on a count of the one or more object requests in the respective request type; aggregating (FIG. 2, 208) the plurality of scores for the plurality of respective request types to provide a malicious activity score (FIG. 4, 434) that represents a likelihood that the illicit enumeration has occurred; comparing (FIG. 2, 210) the malicious activity score to a score threshold (FIG. 4, 440); and selectively performing (FIG. 2, 212, 218) a remedial operation (FIG. 4, 444) with regard to the illicit enumeration based at least in part on whether the malicious activity score is greater than or equal to the score threshold.

IV. Example Computer System

Figure 7:
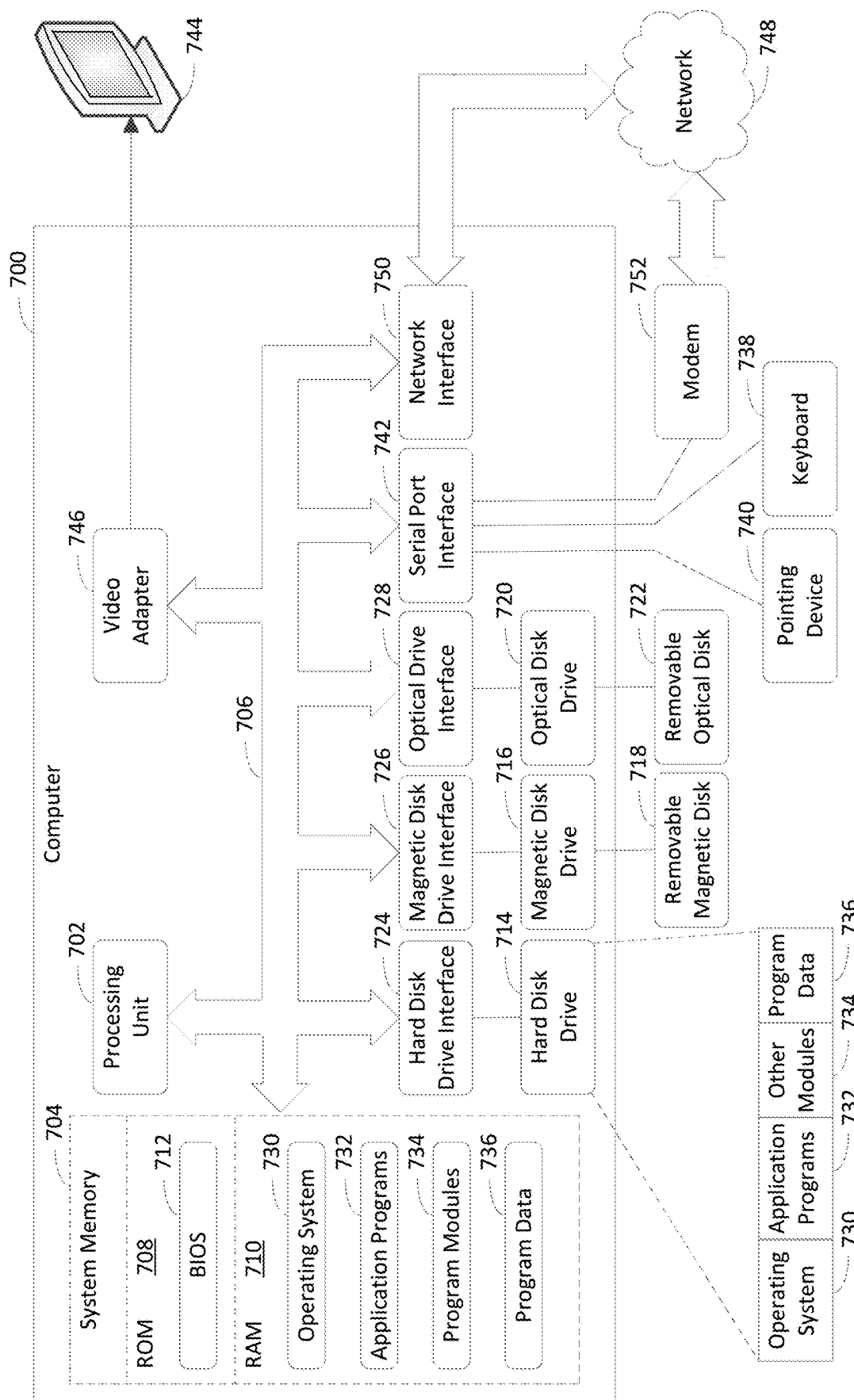
FIG. 7 depicts an example computer in which embodiments may be implemented.

FIG. 7 depicts an example computer 700 in which embodiments may be implemented. Any one or more of the user devices 102A-102M and/or any one or more of the servers 106A-106N shown in FIG. 1 and/or computing system 400 shown in FIG. 4 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of (e.g., at least a portion of) the multi-factor illicit enumeration detection logic 108, the multi-factor illicit enumeration detection logic 408, the parsing logic 412, the scoring logic 414, the aggregating logic 416, the comparison logic 418, the remediation logic 420, the intermediate threshold logic 422, the count threshold logic 424, the weight selection logic 652, the weight aggregation logic 654, flowchart 200 (including any step of flowchart 200), flowchart 300 (including any step of flowchart 300), and/or flowchart 500 (including any step of flowchart 500), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. CONCLUSION

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to detect illicit enumeration, the system comprising:
  memory; and
  a processing system coupled to the memory, the processing system configured to:
    identifying a plurality of object requests from a corpus of object requests, which are directed to a cloud computing service during a period of time, based at least in part on the plurality of object requests being received from a common account of the cloud computing service, each object request in the corpus requesting information about an object;
    parse the plurality of object requests among request types such that each request type includes object requests that share a respective common attribute;
    generate scores for the respective request types such that the score for each request type is based at least in part on a count of the object requests in the respective request type;
    provide a malicious activity score that is based on an aggregation of the scores for the respective request types, the malicious activity score representing a likelihood that the illicit enumeration has occurred;
    compare the malicious activity score to a score threshold; and
    selectively perform a remedial operation with regard to the illicit enumeration based at least in part on whether the malicious activity score is greater than or equal to the score threshold.

2. The system of claim 1, wherein the request types include at least two of the following:
  a successful authentication type, wherein each object request in the successful authentication type is an authentication request that results in a successful authentication of a user;
  a failed authentication type, wherein each object request in the failed authentication type is an authentication request that results in an unsuccessful authentication of a user;
  an entity information type, wherein each object request in the entity information type requests information about a user of the cloud computing service or a group of users of the cloud computing service, and wherein each object request in the entity information type is not an authentication request.

3. The system of claim 1, wherein the processing system is configured to:
  determine a plurality of intermediate request counts for a plurality of respective testing time periods of a testing time frame such that each intermediate request count indicates a number of object requests of a first request type that are received during the respective testing time period;
  select a maximum intermediate request count from the plurality of intermediate request counts to be an intermediate count threshold for the first request type;
  select the intermediate count threshold or a fixed value, whichever is greater, to be the count threshold for the first request type; and
  generate the score of the first request type based at least in part on an extent to which the count of the object requests in the first request type exceeds the count threshold for the first request type.

4. The system of claim 1, wherein the processing system is configured to:
  generate the score of a first request type to be one of a plurality of fixed values based at least in part on an extent to which the count of the object requests in the first request type exceeds a count threshold for the first request type,
  the score being a first fixed value if the count of the object requests in the first request type is less than the count threshold,
  the score being a second fixed value if the count of the object requests in the first request type is in a range between the count threshold and a first product,
  the score being a third fixed value if the count of the object requests in the first request type is in a range between the first product and a second product,
  the first product being a product of the count threshold and a first factor that is greater than one,
  the second product being a product of the count threshold and a second factor that is greater than the first factor.

5. The system of claim 4, wherein the score is a fourth fixed value if the count of the object requests in the first request type is greater than the second product.

6. The system of claim 4, wherein the processing system is configured to:
  generate the score of a second request type to be one of a plurality of second fixed values based at least in part on an extent to which the count of the object requests in the second request type exceeds a second count threshold for the second request type,
  the score being a fourth fixed value if the count of the object requests in the second request type is less than the second count threshold,
  the score being a fifth fixed value if the count of the object requests in the second request type is in a range between the second count threshold and a third product,
  the score being a sixth fixed value if the count of the object requests in the second request type is in a range between the third product and a fourth product,
  the third product being a product of the second count threshold and a third factor that is greater than one,
  the fourth product being a product of the second count threshold and a fourth factor that is greater than the third factor.

7. The system of claim 1, wherein a first request type, which is included among the request types, includes multiple object requests; and
  wherein the processing system is configured to:
    assign a first weight to each of the object requests in the first request type for which the corresponding object is not a sensitive object;
    assign a second weight to each of the object requests in the first request type for which the corresponding object is a sensitive object and is not a default object;
    assign a third weight to each of the object requests in the first request type for which the corresponding object is a sensitive object and is a default object; and
    provide the score, which is based on an aggregation of the weights that are assigned to the respective object requests in the first request type, for the first request type.

8. The system of claim 1, wherein the processing system is configured to:
  selectively perform the remedial operation with regard to the illicit enumeration further based at least in part on whether each of the scores for the respective request types is greater than zero.

9. The system of claim 1, wherein the plurality of object requests includes a Kerberos ticket-granting ticket (TGT) request that requests a TGT.

10. The system of claim 1, wherein the plurality of object requests includes an object request that is configured in accordance with a lightweight directory access protocol (LDAP) and that requests information about an object in a directory service.

11. The system of claim 1, wherein the plurality of object requests includes an object request that is configured in accordance with a security account manager remote (SAMR) protocol and that requests information about an object in a security account manager.

12. The system of claim 1, wherein the plurality of object requests includes an object request that is configured in accordance with a network basic input/output system (NetBIOS) protocol and that requests a NetBIOS name of an object.

13. The system of claim 1, wherein the plurality of object requests includes at least one of:
  a DNS lookup that requests an IP address of an object based on a domain name of the object; or
  a reverse DNS lookup that requests a domain name of an object based on an IP address of the object.

14. The system of claim 1, wherein the plurality of object requests includes an object request that requests access to at least one of an audit log or a sign-in log of the cloud computing service.

15. A method of detecting illicit enumeration, the method implemented by a computing system, the method comprising:
  receiving a plurality of object requests, which are directed to a cloud computing service, during a period of time, each object request requesting information about an object;
  parsing the plurality of object requests among request types such that each request type includes object requests that share a respective common attribute;
  generating scores for the respective request types such that the score for each request type is based at least in part on a count of the object requests in the respective request type, wherein generating the scores comprises:
    generating the score of a first request type to be one of a plurality of fixed values based at least in part on an extent to which the count of the object requests in the first request type exceeds a count threshold for the first request type, the score being a first fixed value if the count of the object requests in the first request type is less than the count threshold, the score being a second fixed value if the count of the object requests in the first request type is in a range between the count threshold and a first product, the score being a third fixed value if the count of the object requests in the first request type is in a range between the first product and a second product, the first product being a product of the count threshold and a first factor that is greater than one, the second product being a product of the count threshold and a second factor that is greater than the first factor;

providing a malicious activity score that is based on an aggregation of the scores for the respective request types, the malicious activity score representing a likelihood that the illicit enumeration has occurred;

comparing the malicious activity score to a score threshold; and selectively performing a remedial operation with regard to the illicit enumeration based at least in part on whether the malicious activity score is greater than or equal to the score threshold.

16. The method of claim 15, wherein the request types include at least two of the following:

a successful authentication type, wherein each object request in the successful authentication type is an authentication request that results in a successful authentication of a user;

a failed authentication type, wherein each object request in the failed authentication type is an authentication request that results in an unsuccessful authentication of a user;

an entity information type, wherein each object request in the entity information type requests information about a user of the cloud computing service or a group of users of the cloud computing service, and wherein each object request in the entity information type is not an authentication request.

17. The method of claim 15, wherein a first request type, which is included among the request types, includes multiple object requests; and wherein generating the scores for the respective request types comprises:

assigning a first weight to each of the object requests in the first request type for which the corresponding object is not a sensitive object;

assigning a second weight to each of the object requests in the first request type for which the corresponding object is a sensitive object and is not a default object;

assigning a third weight to each of the object requests in the first request type for which the corresponding object is a sensitive object and is a default object; and providing the score, which is based on an aggregation of the weights that are assigned to the respective object requests in the first request type, for the first request type.

18. The method of claim 15, wherein selectively performing the remedial operation comprises:

selectively performing the remedial operation with regard to the illicit enumeration further based at least in part on whether each of the scores for the respective request types is greater than zero.

19. The method of claim 15, further comprising:

identifying the plurality of object requests from a corpus of object requests that are received at the cloud computing service based at least in part on the plurality of object requests being received from a common account of the cloud computing service, each object request in the corpus requesting information about an object.

20. The method of claim 15, wherein the score of the first request type is a fourth fixed value if the count of the object requests in the first request type is greater than the second product.

21. A computer program product comprising a computer-readable storage medium having instructions recorded thereon for enabling a processor-based system to perform operations to detect illicit enumeration, the operations comprising:

parsing a plurality of object requests, which are directed to a cloud computing service and which are received during a period of time, among request types such that each request type includes object requests that share a respective common attribute, each object request requesting information about an object;

assigning a first weight to each of the object requests in the first request type for which the corresponding object is not a sensitive object;

assigning a second weight to each of the object requests in the first request type for which the corresponding object is a sensitive object and is not a default object;

assigning a third weight to each of the object requests in the first request type for which the corresponding object is a sensitive object and is a default object;

generating scores for the respective request types such that the score for each request type is based at least in part on a count of the object requests in the respective request type, wherein generating the scores comprises:

generating the score for the first request type by aggregating the weights that are assigned to the respective object requests in the first request type;

providing a malicious activity score that is based on an aggregation of the scores for the respective request types, the malicious activity score representing a likelihood that the illicit enumeration has occurred;

comparing the malicious activity score to a score threshold; and selectively performing a remedial operation with regard to the illicit enumeration based at least in part on whether the malicious activity score is greater than or equal to the score threshold.

* * * * *